United States Patent
Xu et al.

(10) Patent No.: US 10,263,718 B2
(45) Date of Patent: Apr. 16, 2019

(54) UNINTERRUPTED SATELLITE COMMUNICATIONS DURING VEHICLE MOVEMENT

(71) Applicant: ECHOSTAR TECHNOLOGIES L.L.C., Englewood, CO (US)

(72) Inventors: Bin Xu, Centennial, CO (US); Xinhua Yang, Centennial, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 354 days.

(21) Appl. No.: 15/279,040

(22) Filed: Sep. 28, 2016

(65) Prior Publication Data

US 2018/0091243 A1 Mar. 29, 2018

(51) Int. Cl.
*H04H 40/90* (2008.01)
*H04H 20/57* (2008.01)
*H04B 17/318* (2015.01)
*H04W 84/18* (2009.01)

(52) U.S. Cl.
CPC .......... *H04H 40/90* (2013.01); *H04B 17/318* (2015.01); *H04H 20/57* (2013.01); *H04W 84/18* (2013.01)

(58) Field of Classification Search
CPC ........ H04H 40/90; H04H 60/31; H04H 60/91; H04H 20/08; H04H 20/14; H04H 60/37
USPC ........ 455/3.01–3.06, 427, 456.1–457, 422.1, 455/403, 414.1–414.4, 12.1, 426.1, 426.2, 455/445, 550.1, 67.11, 67.13; 725/62–72
See application file for complete search history.

(56) References Cited

U.S. PATENT DOCUMENTS

| | | | |
|---|---|---|---|
| 7,024,156 B2 | 4/2006 | Kawamata et al. | |
| 7,177,589 B1* | 2/2007 | Lynch | H04H 20/28 455/3.04 |
| 9,281,891 B2* | 3/2016 | Lee | H04B 7/18582 |
| 2005/0078678 A1 | 4/2005 | Kim et al. | |
| 2006/0195054 A1 | 8/2006 | Smith et al. | |
| 2008/0129593 A1* | 6/2008 | Garin | G01S 19/27 342/357.66 |
| 2012/0223860 A1* | 9/2012 | Leclercq | G01S 19/34 342/357.63 |
| 2013/0226369 A1 | 8/2013 | Yorio et al. | |
| 2016/0073229 A1* | 3/2016 | Haro | H04W 4/021 455/456.3 |
| 2017/0032402 A1 | 2/2017 | Patsiokas et al. | |
| 2017/0243504 A1* | 8/2017 | Hada | G09B 9/052 |

* cited by examiner

*Primary Examiner* — Keith Ferguson
(74) *Attorney, Agent, or Firm* — Lorenz & Kopf LLP

(57) ABSTRACT

A satellite receiver in a vehicle continues to receive satellite communications even when line-of-sight to the satellite becomes obscured by obtaining a stream of the satellite broadcast via an ad hoc network. When the satellite receiver determines that the satellite broadcast signal is being lost (or is about to be lost), the satellite receiver transmits a request message on an alternate wireless channel seeking an alternate source for the satellite media program. Another satellite receiver that is able to receive the broadcast replies to the request message, and an ad hoc communication session is established with the alternate source via an alternate wireless channel. The receiver is therefore able to receive the media program from the alternate source via the ad hoc session instead of the satellite broadcast signal.

19 Claims, 3 Drawing Sheets

UNINTERRUPTED SATELLITE COMMUNICATIONS DURING VEHICLE MOVEMENT

TECHNICAL FIELD

The following discussion generally relates to reliable satellite communications. More particularly, the following discussion relates to systems, devices and processes to maintain reliable satellite reception in a moving vehicle.

BACKGROUND

Satellite broadcast services that provide audio and/or video media content are becoming increasingly popular. Satellite radio is often a standard feature on many vehicles, and many consumers enjoy satellite based entertainment while they drive, fly, boat or otherwise travel.

Satellite broadcasts, however, are inherently susceptible to interruptions caused by terrain, tunnels, bridges and other objects that can block a vehicle's reception of the satellite broadcast. As a vehicle passes through a tunnel, for example, the line-of-sight to the satellite can be blocked, thereby leading to disruptions in signal reception.

It is therefore desirable to create systems, devices and processes for improving the reception of satellite broadcast signals in vehicles. These and other desirable features and characteristics will become apparent from the subsequent detailed description and the appended claims, taken in conjunction with the accompanying drawings and this background section.

BRIEF SUMMARY

According to various embodiments, a satellite receiver deployed in an automobile, aircraft, watercraft or other vehicle is equipped with an enhanced wireless transceiver capable of establishing ad hoc connections with other satellite receivers located nearby. If a satellite receiver becomes unable to receive a clear satellite signal due to an obstruction or the like, it can nevertheless use the ad hoc wireless connection to obtain the obstructed signal from an unobstructed nearby receiver. Ad hoc communications may be established as needed (e.g., when a received signal strength drops below a threshold), on a predictive basis (e.g., just before a satellite signal is predicted to be blocked) and/or on an a priori basis wherein ad hoc communications are established between vehicles for improved redundancy and for faster response in the event of signal loss. Other embodiments could be modified in any number of ways.

According to certain example embodiments, a process executable by a satellite receiver in a vehicle suitably comprises: receiving, by the satellite receiver, a satellite broadcast signal that encodes a media program; determining, by the satellite receiver, that the satellite broadcast signal is being lost; in response to determining that the satellite broadcast signal is being lost, the satellite receiver transmitting a request message on an alternate wireless channel seeking an alternate source for the media program encoded by the satellite broadcast signal; receiving a response to the request message identifying the alternate source via the alternate wireless channel, wherein the response is transmitted by the alternate source in response to the request message; and establishing an ad hoc session with the alternate source identified in the response message via the alternate wireless channel to thereby receive the media program from the alternate source via the ad hoc session instead of the satellite broadcast signal.

Other example embodiments provide a satellite receiver device that comprises a processor, a memory, a satellite receiver and a wireless transceiver. The memory is configured to store instructions that are executable by the processor. In some embodiments, the instructions direct the processor to perform a processing routine that comprises initially receiving a satellite broadcast signal via the satellite receiver, wherein the satellite broadcast signal encodes a media program; determining that the satellite broadcast signal is being lost; in response to determining that the satellite broadcast signal is being lost, transmitting a request message on an alternate wireless channel via the wireless transceiver, wherein the request message seeks an alternate source for the media program encoded by the satellite broadcast signal; receiving, via the wireless transceiver, a response to the request message identifying the alternate source, wherein the response is transmitted by the alternate source in response to the request message; and establishing an ad hoc session with the alternate source identified in the response message via the wireless transceiver to thereby receive the media program from the alternate source via the ad hoc session instead of via the satellite broadcast signal.

Many other example embodiments and modifications to these examples are set forth below.

BRIEF DESCRIPTION OF THE DRAWING FIGURES

Example embodiments will hereinafter be described in conjunction with the following drawing figures, wherein like numerals denote like elements, and FIG. 1 is a block diagram showing an example of system in which multiple satellite receivers establish ad hoc communications sessions for sharing satellite signals.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various embodiments, a satellite receiver deployed in a vehicle is able to establish ad hoc wireless communications with other satellite receivers located nearby for obtaining satellite signals when direct reception is difficult or impossible. If the vehicle moves into a tunnel, for example, or encounters another obstruction that blocks direct satellite reception, the satellite receiver uses ad hoc communications with other nearby receivers to obtain the blocked signals, thereby reducing or eliminating interruptions and improving the user experience. Ad hoc communications between satellite receivers may take place using local area, personal area or other network protocols, for example, or using any other standard or custom protocols.

Figure 1:
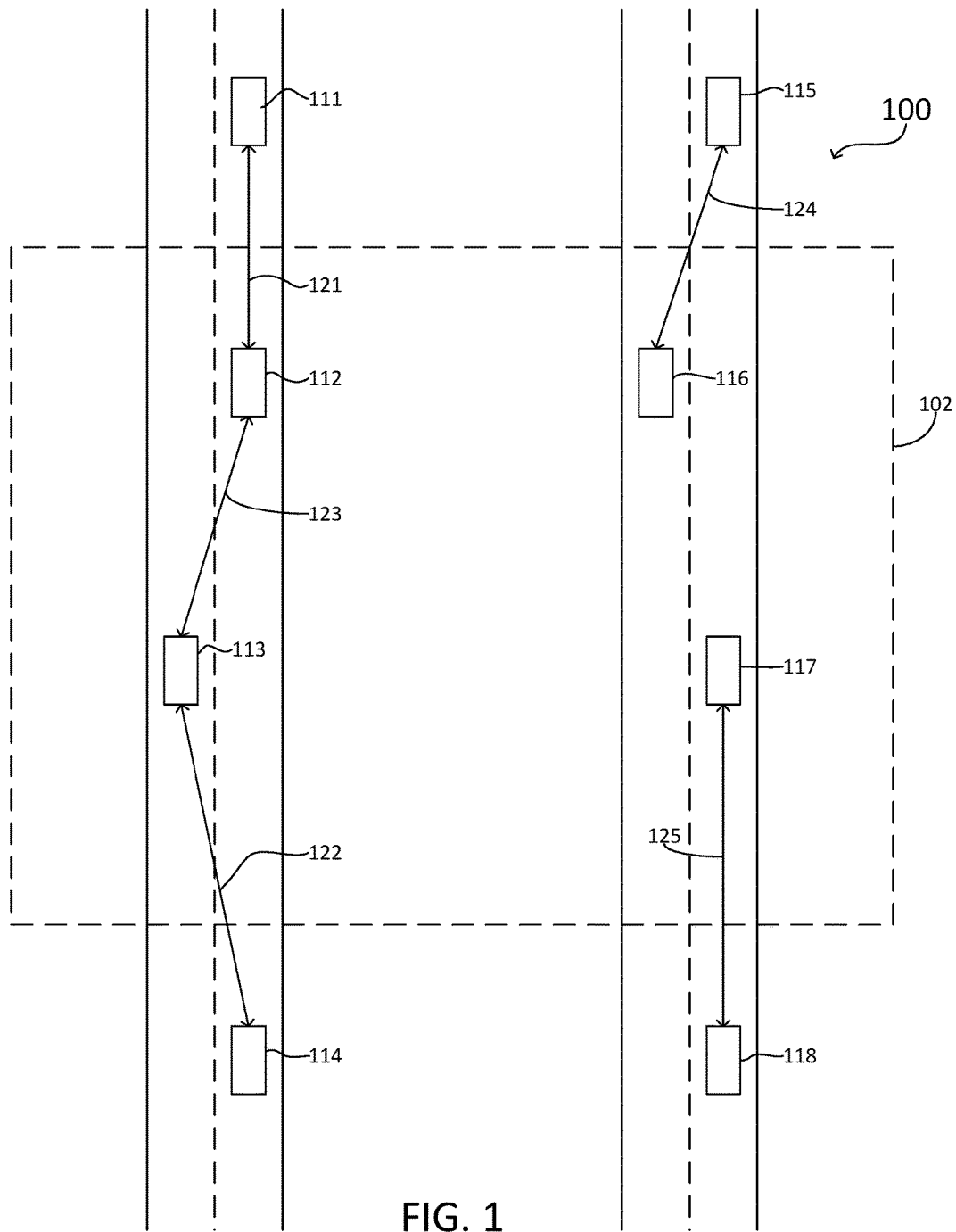

Turning now to the drawing figures and with initial reference to FIG. 1, an example system 100 includes any number of satellite receivers 111-118 each associated with a vehicle. As the vehicle encounters an obstruction 102 that prevents effective reception of satellite signals, the satellite receiver 111-118 attempts to communicate with another receiver 111-118 that is able to receive the blocked signal. The receivers establish ad hoc communications sessions 121-125 whereby the receiver that has access to the satellite signal is able to forward the received signal to the blocked receiver.

If object 102 is a tunnel for a roadway, for example, vehicles passing through the tunnel will typically lose line-of-sight (LOS) communications with the satellite, thereby leading to signal degradation or loss, and possibly interruption of playback to the user, which can be quite annoying. To prevent loss of signal, the receivers 111-118 are programmed or otherwise configured to locate other receivers 111-118 that are outside the shadow of obstructing object 102 or that are otherwise able to receive the unobstructed signal. The blocked receiver and the unblocked receiver are able to establish ad hoc communications 121-125, as desired.

Each satellite receiver 111-118 is an audio and/or video receiver device capable of receiving satellite broadcasts, of demodulating and decoding the received broadcasts, and of rendering the decoded media content for playback to a user. Satellite receivers 111-118 may be conventional satellite radio receivers (e.g., SIRIUS XM satellite receivers or the like) incorporating hardware, software and/or firmware to provide the various functions herein. Other embodiments could be implemented using other receiver devices available from any source that are compatible with any satellite audio and/or video broadcasting service. To that end, various embodiments of satellite receivers 111-118 may process any sort of audio content, video content, digital data and/or any other types of satellite content, as desired.

Satellite receivers 111-118 may be deployed within or otherwise associated with any sort of vehicles. The examples provided herein often refer to receivers 111-118 as satellite radio receivers operating within automobiles, but equivalent embodiments could associate receivers 111-118 with any sort of cars, trucks, automobiles, motorcycles, all terrain vehicles (ATVs), motor homes and other recreational vehicles (RVs), bicycles, snowmobiles, boats or other watercraft, fixed or rotary wing aircraft, spacecraft and/or any other motorized or non-motorized vehicles, as desired. Still other embodiments could equivalently apply to satellite receivers carried by human users, such as any sort of handheld or wearable satellite receivers. Satellite receivers 111-118 may be implemented within devices that are capable of other functions such as terrestrial radio or television receivers, mobile telephones, personal digital assistants, global positioning or navigating systems, satellite modulator/demodulator (modem) devices and/or the like. Additional detail about example receiver devices is provided with reference to FIG. 2 below.

Ad hoc connections 121-125 could be variously implemented using any sort of local area network (LAN), personal area network (PAN), vehicular ad hoc network (VANET), smart phone ad hoc network (SPAN), other mobile ad hoc data network (MANET) and/or the like. Ideally such connections are infrastructure-less and self-configuring, although other embodiments could make use of any mobile or other wireless network infrastructure that may be available. Connections 121-125 are transmitted using any sort of terrestrial radio frequency (RF) signals on any frequency band, including any sort of public or private bands. Ad hoc connections 121-125 are typically (although not necessarily) digital wireless connections established according to well-known protocols. Examples of protocols that could be used to implement various types of ad hoc connections 121-125 could include, without limitation, any sort of IEEE 801.11 (e.g., "WI-FI") protocols, any sort of IEEE 802.15 (e.g., "BLUETOOTH" IEEE 802.15.1 or "ZIGBEE" IEEE 802.15.4 protocols) or the like, although other embodiments could use any open, standard or non-standard protocols and frequencies, including any protocols that are subsequently developed. Additional detail about a process 300 to transfer satellite content via an ad-hoc connection between two receivers 111-118 is provided below with reference to FIG. 3.

Further embodiments may allow daisy chaining or multiple links 121-125 between receivers, as desired. In FIG. 1, for example, receiver 112 could receive a blocked signal directly from receiver 111. If such a connection were not available or were not readily identified, however, a multi-hop connection could be established from receiver 112 to receiver 114 via receiver 113. To facilitate such connections, receivers 111-118 may establish channel lists or the like with each other to indicate which receivers have access to which channels. These channel lists may be exchanged on any period or aperiodic basis, as requested by one or more receivers, or on any other basis as desired. If receiver 112 were to request a channel available to receiver 114, for example, receiver 112 could initially request the needed channel. This request could be forwarded by receiver 113 via broadcast or a previously established point-to-point connection with receiver 114, as appropriate. In other embodiments, receivers 111-118 could exchange lists of available channels with each other so that receiver 114 transmits a list of channels to receiver 113, thereby allowing receiver 113 to respond to receiver 112 that a signal source is available even if receiver 112 is not currently able to interact directly with receiver 114. In such instances, receiver 113 would typically act as a signal bridge or repeater 112 and 114, thereby intermediating communications between the two receivers. Various embodiments could provide transmit, receive and/or intermediating capabilities in all of the receivers 111-118 for maximum flexibility and coverage, but other embodiments would not require all receivers 111-118 to provide all of the capabilities described herein.

Figure 2:
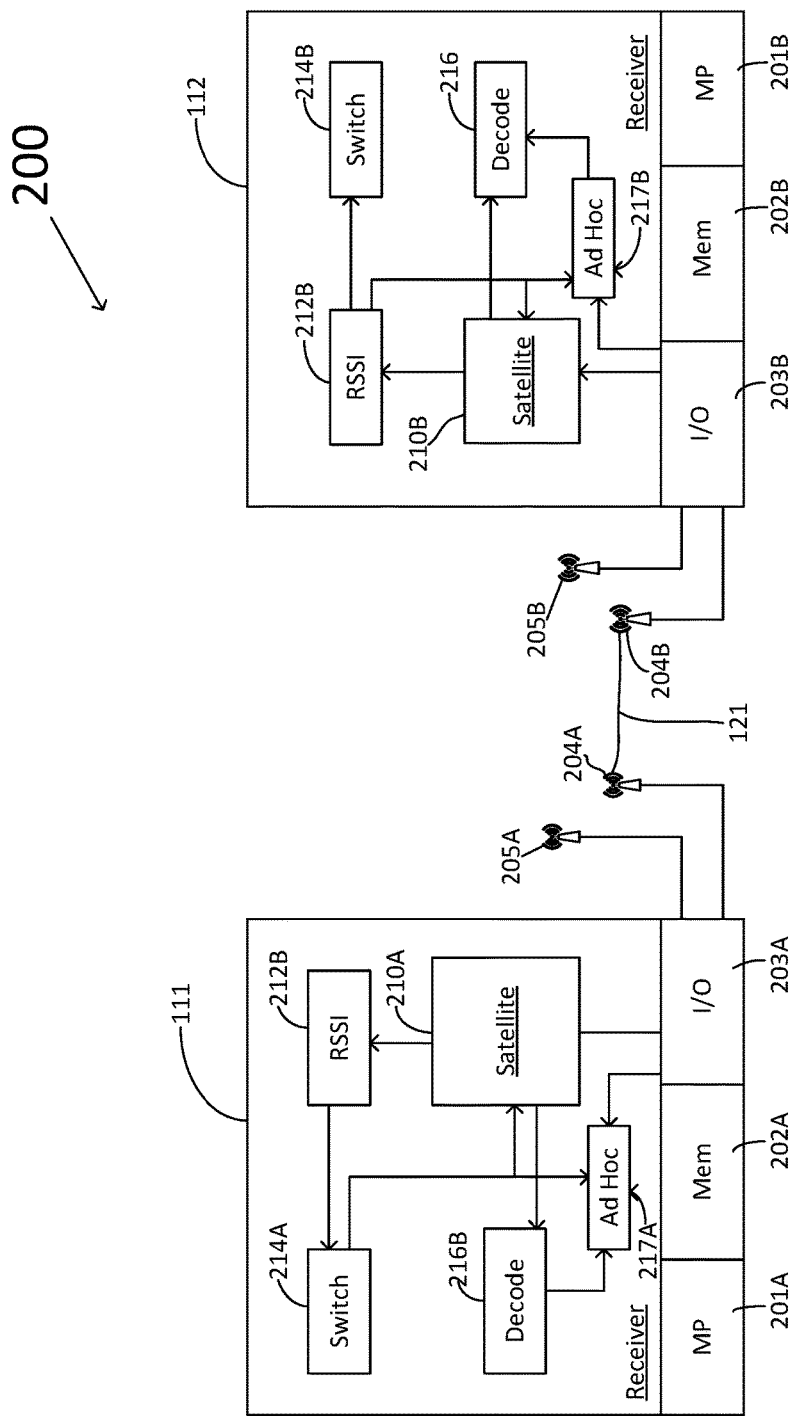
FIG. 2 is a block diagram showing example devices for receiving and processing satellite broadcast signals.

FIG. 2 provides block diagrams of two receivers 111 and 112. In the example shown, each of the two receivers 111, 112 includes similar, if not identical components so that either receiver is capable of acting as a signal relay and/or as a signal recipient. FIG. 2 labels the identical components of the two receivers using "A" for receiver 111 and "B" for receiver 112 for clarity. Practical implementations, however, may have some differences between the relaying and receiving components due to variations in different devices, manufacturers, protocols and the like. Ideally receivers 111-118 from different manufacturers and sources would be compatible with each other within system 100, thereby leading to increased coverage through wider participation, but possibly leading to some variation between compatible devices.

FIG. 2 illustrates an expanded example from FIG. 1 in which satellite receiver 112 is within the RF shadow of object 102, thereby blocking line-of-site signals from a satellite and potentially disrupting satellite radio or video playback by device 112. To prevent unwanted disruption, device 112 is able to establish an ad hoc connection 121 with satellite receiver in, which is outside the RF shadow of object 102 and thereby able to receive the satellite signals desired by device 112.

As illustrated in FIG. 2, each device in and 112 suitably includes processing hardware including a processor 201, memory 202 and input/output interfaces 203 that are able to receive RF signals via one or more antennas 204, 205.

Processor 201 is any sort of microprocessor, microcontroller, digital signal processor or the like capable of executing program instructions to implement the various functions described herein. Program instructions and data may be stored in any sort of data storage 202, which may be implemented using any type of static, dynamic, flash or other memory, and/or with any sort of optical, magnetic or other data storage. Interfaces 203 include electrical and mechanical interfaces for connecting antenna(s) 204, 205, or for otherwise communicating with other devices as desired.

Devices 111-112 transmit and receive radio frequency or other wireless communications using one or more antennas 204, 205. FIG. 2 shows two separate antennas 204, 205 for satellite and terrestrial RF signals, but other embodiments could equivalently receive both satellite and terrestrial signals using a single multi-band antenna, as desired. Alternatively, a single antenna may be switchably tuned between satellite and terrestrial frequencies as needed.

Satellite receiver devices 111, 112 include demodulators 210 and 217 for satellite and ad hoc terrestrial signals, respectively. Demodulators 210 and 217 use appropriate hardware, software and/or firmware to receive the RF signal from the antenna and to demodulate the received signals so that they can be decoded for presentation to the user. In various embodiments, demodulators 210 and 217 are implemented within separate integrated circuits, although some embodiments could use a hybrid demodulator, as desired. Some embodiments could implement the demodulation features within the hardware interfaces 203 using appropriate demodulation chips, circuitry or other programming logic.

Decoder 216 is any circuitry capable of decoding received signals (typically, although not necessarily, in digital format) for playback to the user. Decoding may be performed by any sort of specialized or general purpose computing logic, such as a decoder chip or the like. In other embodiments, the decoding feature is built into a digital signal processor or similar hardware processor 201. Such a processor may alternatively or additionally include demodulation capabilities for one or more different frequency bands, as desired.

In the example shown in FIG. 2, satellite receivers 111, 112 include a signal strength indicator 212 that determines the strength of the received satellite broadcast signal. In various embodiments, strength indicator 212 is a received signal strength indicator (RSSI) circuit or similar feature that is built into a satellite receiver chip or other circuitry.

Even though FIG. 2 shows strength indicator 212 as a separate feature, then, in practice indicator 212 may be physically integrated with satellite demodulator 210, with interface 203, or with other components of the receiver devices. In various embodiments, processor 201 or other circuitry within the receiver device monitors the strength (e.g., intensity) of the received satellite broadcast signal, determines when the signal strength is too low to reliably proceed, and switches to receive satellite content via the ad hoc connection 121 when the signal strength indicates that it would be desirable to do so.

If the signal strength drops below an acceptable threshold (and/or a signal loss is predicted), then signal reception can be switched to receive the signal via the ad hoc communication rather than directly from the satellite. Receiver device 111, 112 typically maintains the satellite reception as long as the signal strength supports reliable reception, and so long as the user wishes to continue the current program. If the signal strength decreases, however, it may be desirable (if not necessary) to obtain the programming from an alternate source to continue playback.

To that end, switching logic 214 suitably compares the signal strength to an appropriate threshold and, if the signal strength drops below the threshold, switches reception from the satellite to the ad hoc communications. Switching logic 214 may be implemented using hardware logic (e.g., as a comparator circuit in conjunction with a transistor, relay or similar switch), or using digital signal processing logic within processor 201 or the like. In various embodiments, processor 201 implements the switching logic 214 by comparing a digital representation of the then-current signal strength with the appropriate threshold, and by controlling the satellite and terrestrial demodulators in response to changes in the signal strength. Other embodiments may operate in any other manner, using any appropriate switching hardware, software, firmware or other logic.

The comparator threshold may be determined in any manner, and may vary widely from embodiment to embodiment. In some implementations, it may be desirable to switch away from the satellite signal (or at least begin seeking alternate sources of the signal) if the signal strength drops below about 50% or so of the previous level. Other embodiments may wish to trigger switching at 25% or so, or at any other level, noting that higher thresholds may provide greater reliability and responsiveness to signal degradation at the expense of more frequent switching. The optimal threshold level will therefore be configurable depending on the desired level of responsiveness vis a vis the desire to minimize switching. Other embodiments may use more dynamic thresholds that adapt based upon then-current conditions, or that change based upon weather, user configuration, traffic density, signal strength history, geography, antenna size, antenna type and/or any number of other factors. In some embodiments, for example, the threshold could be adapted if prior attempts to locate an alternate source for satellite signals were unsuccessful so that fewer subsequent attempts are made to switch to terrestrial sources. Other embodiments could be enhanced or otherwise modified in any manner.

Equivalent embodiments could replace or supplement the RSSI feature with predictive logic that predicts when the vehicle is about to enter an area in which the received satellite signal is blocked, or otherwise difficult to receive. This predictive feature could be implemented in any number of different ways. To provide just one example, a predictive feature could compare GPS coordinates or other indicia of the then-current location of the vehicle with a geographic information system (GIS) database to identify when the vehicle is heading into a region that is known to have unreliable satellite communications. The GIS database may be located onboard the vehicle (e.g., in memory 202 or other storage available to receivers 111, 112), or external to the vehicle on a remotely-located server. In the latter case, the server may be accessible via a mobile telephone or satellite phone connection on any regular or irregular temporal basis, as appropriate. An external GIS database may also be used to track the location of the vehicle, and/or locations of other vehicles that may server as possible relays to the current vehicle, when needed. To that end, receivers in and/or 112 may communicate with on-board or external data services to predict periods of unreliable communications and/or to establish communications with each other, as desired.

Figure 3:
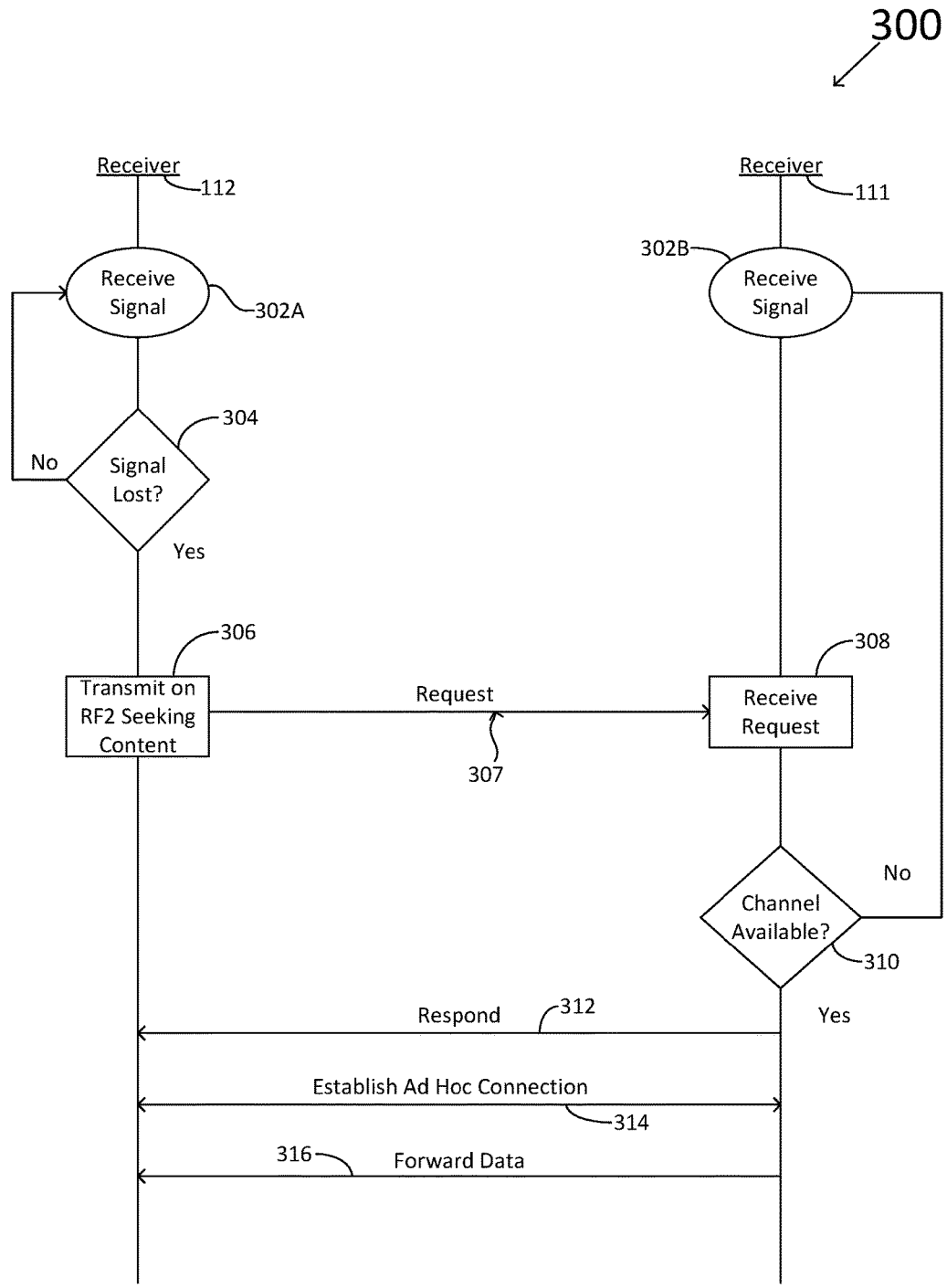
FIG. 3 is a flow diagram showing an example process for delivering satellite broadcast signals via an ad hoc wireless connection.

FIG. 3 shows an example process 30o executable by a satellite receiver 110-118 to obtain satellite media content via an ad hoc wireless connection 121-125. The various functions shown in FIG. 3 may be performed by hardware, software, firmware or other processing logic within one or more receiver devices 110-118, as appropriate. In the illustrated example, satellite receiver 111 is able to receive a satellite signal that is otherwise unavailable to receiver 112, thereby triggering ad hoc delivery via connection 121. The general concepts illustrated in this example are applicable to any number of other examples and embodiments.

Generally speaking, satellite receivers 110, 111 operating within any particular vicinity will each receive and monitor satellite broadcast signals as desired (function 302A-B). Reception may take place whenever the satellite receiver function is enabled by the user; various embodiments could additionally receive satellite broadcasts even if the receiver is on standby or is processing media from other sources. If a user is listening to a conventional AM or FM radio broadcast, for example, the receiver device could nevertheless still receive satellite broadcasts on a different frequency band in the background for re-distribution to other receivers in some implementations.

In the example of FIG. 3, receiver 112 is initially able to receive a satellite broadcast signal carrying a program channel or the like. As the vehicle associated with receiver 112 enters the RF shadow of an object 102 or the like, however, the strength of the received satellite broadcast signal suitably diminishes, thereby increasing the likelihood of an interruption in the program content. Receiver 112 monitors the actual and/or predicted signal strength (function 304) in any manner, and reacts to an appropriate degradation to trigger a switch to an alternate source of content. Function 304 may involve, for example, strength indicator 212, processor 201 and/or switch 214 interacting to identify a decrease in signal strength and to switch away from satellite signals, as appropriate. Various embodiments could switch to terrestrial signals using the techniques set forth with respect to FIG. 2 above, for example, or using any other techniques (including predictive techniques) as desired. As noted above, equivalent embodiments of function 304 could compare the then-current vehicle location with information from an onboard or remote GIS database or the like to predict when the vehicle is about to lose the satellite broadcast, thereby allowing an ad hoc connection or other source for the signal to be preemptively established, thereby further reducing the chances of signal interruption. Predictive techniques may be combined with actual signal monitoring, if desired, to accommodate changing satellite coverage, gaps in database information, inaccuracies in GPS or other positioning, and/or other factors as desired. In some further embodiments, signal strength data is shared with a remote service (e.g., via satellite or mobile telephone links) to improve the accuracy and completeness of the GIS database.

When ad-hoc communications are desired, receiver 112 initiates ad hoc communications in any manner (function 306). In the embodiment shown in FIG. 3, receiver 112 initiates ad hoc communications by transmitting a broadcast message 307 requesting access to satellite content. The particular contents of message 307 will vary from embodiment to embodiment based upon the particular communications protocols that are used. In various embodiments, message 307 will simply request responses from any available alternate sources 111-118, and then the particular signals requested will be identified through subsequent messages. Equivalently, message 307 could request a source for a particular content channel so that only receivers in having current access to the requested channel would respond.

Ad hoc communications could be established at any time, and in any manner desired. In the example illustrated in FIG. 3, ad hoc communications are initiated when the signal strength drops below a threshold value, when satellite signals are deemed to be unreliable for continued use. In such embodiments, functions 306-314 occur in response to a low signal strength determination. Rather than reactively waiting for actual degradation or loss of the satellite signal to establish the ad hoc connection 121, equivalent embodiments could proactively establish the ad hoc connection 121 as other receivers 111 are discovered, thereby allowing for faster retrieval of satellite content. That is, functions 306-314 could be performed prior to function 304 in an equivalent embodiment. To that end, function 306 could equivalently involve transmitting period (or aperiodic) broadcasts to identify other compatible receivers 111 capable of exchanging satellite content with receiver 112, even though a satellite signal disruption has not yet occurred. Ideally, both receivers 111 and 112 would be able to exchange content with each other as needed, thereby extending the available reception area for both receivers, although equivalent embodiments could allow only one receiver to supply content to the other, as desired. Further embodiments could additionally or alternately make use of predictive techniques, as described above.

As noted above, requests 307 may trigger responses from all available sources in the receiving vicinity, or only from those sources having convenient access to a specific channel identified in the request. In various embodiments, multiple satellite channels are multiplexed onto a single transponder so that a receiver simultaneously receives and demodulates multiple channels of content, even though only one channel is decoded for presentation to a viewer. In some cases, it may be possible for a satellite receiver 111 to receive a particular channel for forwarding to another receiver 112 even though the user of receiver 111 is listening to another channel on that same transponder. It may not be necessary, then, that the users of both receivers 111 and 112 be listening to the same channel, since receiver 111 may be able to provide another channel that is received (but not necessarily decoded) on the same satellite signal as the channel currently enjoyed by the user of receiver 111.

If receiver 111 is not able to deliver content identified in request 312, then receiver 111 will continue to receive and monitor satellite signals as normal (function 310). If the alternate receiver 111 does have access to the requested content, however, receiver 111 transmits a response 312 to the request 312 identifying itself or otherwise providing information that allows the two receivers 111, 112 to establish the ad hoc connection 121 (function 314). Response 312 may include additional information such as signal strength data from the alternate source 111, thereby allowing the requesting device 112 to select between multiple responding devices based upon which responder has the strongest signal. Other embodiments could provide a listing of available channels in the response 314, or an indication that one or more channels would be delivered via a multi-hop connection to another receiver. To that end, the amount and type of data that is exchanged between the requesting and responding devices could vary significantly from embodiment to embodiment.

The ad hoc connection 121 may be established in any manner (function 314). Typically, the particular ad hoc protocol will specify how connections are initiated, maintained and terminated between the communicating devices 111, 112. Connections may be maintained even after satellite signals are restored to the requesting device so that the two devices 111, 112 can quickly share data as needed if another obstruction should occur, if desired. Alternate embodiments of function 314 could make use of geolocation data maintained about the relaying and receiving receivers (or their associated vehicles) so that suitable communicants can be selected and contacted, to improve connectability between components, and/or for any other purpose.

Satellite content is transmitted from the alternate source 111 to the requesting device 112 in any manner (function 316). In some implementations, the requested data is encapsulated within data headers appropriate to the ad hoc network so that the receiving device is able to receive the content, to strip off the header, and to process the received content as normal. Satellite content may be received at the alternate source 111 and encapsulated within the ad hoc format for transmission to the blocked device 112, thereby allowing device 112 to extract the received content and decode it for playback to the user as desired. Other embodiments may supplement or adapt the encapsulating and data transfer process in any manner desired.

The various processes, devices and systems described herein may be readily adapted for any number of equivalent environments and applications. Ad hoc communications may use any sort of open or proprietary protocols, for example, including any sort of digital or analog RF broadcasts on any frequencies. The techniques herein may be equivalently deployed on any sort of powered or unpowered vehicles, including cars, trucks, motor homes, all terrain vehicles (ATVs), motorcycles, bicycles, fixed or rotary wing aircraft, watercraft of any sort, spacecraft and/or any other vehicles.

The term "exemplary" is used herein to represent one example, instance or illustration that may have any number of equivalent alternatives. Any implementation described herein as "exemplary" is not necessarily to be construed as preferred or advantageous over other implementations, but rather as a mere example. While several example embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is claimed is:

1. A process executable by a satellite receiver in a vehicle, the process comprising:
   receiving, by the satellite receiver, a satellite broadcast signal that encodes a media program on a channel modulated by the satellite broadcast signal;
   determining, by the satellite receiver, that the satellite broadcast signal is being lost;
   in response to determining that the satellite broadcast signal is being lost, the satellite receiver transmitting a request message on an alternate wireless channel seeking an alternate source for the media program encoded by the satellite broadcast signal, wherein the request message transmitted on the alternate wireless channel indicates the channel of the satellite broadcast signal that encodes the media program;
   receiving a response to the request message identifying the alternate source via the alternate wireless channel, wherein the response is transmitted by the alternate source in response to the request message; and
   establishing an ad hoc session with the alternate source identified in the response message via the alternate wireless channel to thereby receive the media program from the alternate source via the ad hoc session instead of the satellite broadcast signal.

2. The process of claim 1 wherein the determining comprises the satellite receiver comparing a received signal strength indicator (RSSI) value associated with the satellite broadcast signal to a threshold value and, if the RSSI value is less than the threshold value, indicating that the satellite broadcast signal is being lost.

3. The process of claim 2 wherein the establishing comprises switching the satellite receiver to receive the media program via a wireless network interface tuned to receive the alternate wireless channel instead of via a satellite interface.

4. The process of claim 3 further comprising the satellite receiver continuing to monitor the RSSI value associated with the satellite broadcast signal while receiving the media program via the wireless network interface, and switching the satellite receiver to once again receive the media program via the satellite interface when the wireless satellite signal is no longer being lost.

5. The process of claim 1 wherein the alternate source receives the indicated channel via the satellite broadcast channel and re-transmits the indicated channel to the satellite receiver via the alternate wireless channel.

6. The process of claim 5 wherein the satellite broadcast signal is blocked to the satellite receiver but not to the alternate source.

7. The process of claim 1 wherein the determining comprises the satellite receiver predicting that the satellite broadcast signal is about to be lost based upon a comparison of a location of the vehicle with information obtained from a geographic information system database.

8. The process of claim 7 wherein the geographic information system database is located on board the satellite receiver.

9. The process of claim 7 wherein the geographic information system database is remotely located from the satellite receiver, and wherein the satellite receiver obtains the information from the geographic information system databased via a telephone connection.

10. The process of claim 1 wherein the alternate wireless channel is a mobile ad hoc data network.

11. The process of claim 1 wherein the alternate wireless channel is an IEEE 802.15 network.

12. The process of claim 1 wherein the alternate wireless channel is an IEEE 802.11 network.

13. A satellite receiver device comprising a processor, a memory, a satellite receiver and a wireless transceiver, wherein the memory is configured to store instructions that are executable by the processor to perform a method comprising:
   receiving a satellite broadcast signal via the satellite receiver, wherein the satellite broadcast signal encodes a media program on a channel modulated by the satellite broadcast signal;
   determining that the satellite broadcast signal is being lost;
   in response to determining that the satellite broadcast signal is being lost, transmitting a request message on an alternate wireless channel via the wireless transceiver, wherein the request message indicates the channel of the satellite broadcast signal that encodes the media program and seeks an alternate source for the media program encoded by the satellite broadcast signal;
   receiving, via the wireless transceiver, a response to the request message identifying the alternate source, wherein the response is transmitted by the alternate source in response to the request message; and establishing an ad hoc session with the alternate source identified in the response message via the wireless transceiver to thereby receive the media program from the alternate source via the ad hoc session instead of via the satellite broadcast signal.

14. The satellite receiver device of claim 13 wherein the determining comprises comparing a received signal strength indicator (RSSI) value associated with the satellite broadcast signal to a threshold value and, if the RSSI value is less than the threshold value, switching the satellite receiver to receive the media program via the wireless transceiver instead of via a satellite interface.

15. The satellite receiver device of claim 14 wherein the alternate source receives the indicated channel via the satellite broadcast channel and re-transmits the indicated channel to the satellite receiver device via the alternate wireless channel.

16. The satellite receiver device of claim 13 wherein the determining comprises predicting that the satellite broadcast signal is about to be lost based upon a comparison of a location of the satellite receiver device with information obtained from a geographic information system database.

17. The satellite receiver device of claim 16 wherein the geographic information system database is located on board the satellite receiver device.

18. The satellite receiver device of claim 16 wherein the geographic information system database is remotely located from the satellite receiver device, and wherein the satellite receiver device obtains the information from the geographic information system database via a telephone connection.

19. The satellite receiver device of claim 16 wherein the wireless transceiver is a network interface, and wherein the alternate wireless channel is a mobile ad hoc data network.

* * * * *